United States Patent
Changlani et al.

(10) Patent No.: US 11,134,411 B2
(45) Date of Patent: Sep. 28, 2021

(54) DYNAMIC UPLINK RESOURCE UNIT SCHEDULING FOR UL-OFDMA IN 802.11AX NETWORKS

(71) Applicant: Hewlett Packard Enterprise Development LP, Houston, TX (US)

(72) Inventors: Nitin Changlani, Milpitas, CA (US); Eldad Perahia, Park City, UT (US); Sachin Ganu, San Jose, CA (US); Mohd Shahnawaz Siraj, San Jose, CA (US); Gaurav Patwardhan, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 68 days.

(21) Appl. No.: 16/527,189

(22) Filed: Jul. 31, 2019

(65) Prior Publication Data

US 2021/0037412 A1    Feb. 4, 2021

(51) Int. Cl.
*H04W 72/04* (2009.01)
*H04W 28/02* (2009.01)
(Continued)

(52) U.S. Cl.
CPC ....... *H04W 28/0278* (2013.01); *H04L 1/0004* (2013.01); *H04W 72/1252* (2013.01); *H04W 74/0833* (2013.01)

(58) Field of Classification Search
CPC ......... H04W 28/0278; H04W 72/1252; H04W 72/1284; H04W 72/1268; H04W 72/0446;
(Continued)

(56) References Cited

U.S. PATENT DOCUMENTS 10,116,360 B2    10/2018  Seok
2001/0055972 A1*  12/2001  Sakata ................ H04W 28/20
                                              455/452.2
(Continued)

FOREIGN PATENT DOCUMENTS

GB          2549967      11/2017
WO    WO-2017000459       1/2017

OTHER PUBLICATIONS

Bankov, D. et al., IEEE 802.11ax Uplink Scheduler to Minimize Delay: a Classic Problem with New Constraints, (Research Paper), International Symposium on Personal, Indoor and Mobile Radio Communications (IEEE PIMRC 2017) Oct. 2017, 6 Pgs.

*Primary Examiner* — Hassan Kizou
*Assistant Examiner* — Mahbubul Bar Chowdhury
(74) *Attorney, Agent, or Firm* — Hewlett Packard Enterprise Patent Department

(57) ABSTRACT

Systems and methods for uplink Resource Unit scheduling include receiving, by a network device and from each of a plurality of stations, a status of a buffer, determining for each of the plurality of stations, by the network device, whether the status of the buffer of a particular station exceeds a first threshold, a second threshold, or neither the first threshold or the second threshold, in response to the buffer of the particular station exceeding the first threshold, scheduling the particular station using Uplink Multi-User Multiple Input Multiple Output, in response to the buffer of the particular station exceeding the second threshold, scheduling the particular station using a scheduled RU, and in response to the buffer exceeding neither the first threshold or second threshold, scheduling the particular station using a random-access resource unit (RA-RU).

20 Claims, 5 Drawing Sheets

(51) Int. Cl.
    *H04W 72/12*    (2009.01)
    *H04L 1/00*     (2006.01)
    *H04W 74/08*    (2009.01)

(58) Field of Classification Search
    CPC ......... H04W 72/0453; H04W 74/0833; H04W 84/12; H04L 1/0004; H04L 1/0015; H04L 5/00; H04B 7/0452
    See application file for complete search history.

(56) References Cited

U.S. PATENT DOCUMENTS

| | | | |
|---|---|---|---|
| 2014/0019593 A1* | 1/2014 | Reznik | H04N 21/26258 709/219 |
| 2015/0382369 A1* | 12/2015 | Heo | H04W 8/24 370/329 |
| 2016/0262173 A1* | 9/2016 | Josiam | H04B 7/0452 |
| 2017/0196010 A1* | 7/2017 | Matsuo | H04W 72/0453 |
| 2017/0332385 A1 | 11/2017 | Shirali et al. | |
| 2018/0020373 A1* | 1/2018 | Viger | H04W 74/0816 |
| 2019/0007977 A1* | 1/2019 | Asterjadhi | H04W 74/006 |
| 2019/0159220 A1* | 5/2019 | Elsherif | H04W 72/12 |
| 2020/0029350 A1* | 1/2020 | Asterjadhi | H04W 28/18 |
| 2020/0068585 A1* | 2/2020 | Yoshikawa | H04W 28/0278 |
| 2021/0007137 A1* | 1/2021 | Abouelseoud | H04W 74/0808 |

\* cited by examiner

DYNAMIC UPLINK RESOURCE UNIT SCHEDULING FOR UL-OFDMA IN 802.11AX NETWORKS

BACKGROUND

The explosion and proliferation of wireless electronic devices has led to an increasing number of challenges in trying to accommodate the increasing number of users on wireless communication channels. For example, high levels of interference brought about by large numbers of users threatens to degrade the levels of network performance that users have come to expect. The Institute of Electrical and Electronics Engineers (IEEE) publish many popular specifications for use in wireless under the 802.11 standard family. 802.11 continues to evolve in an attempt to address all challenges presented with the proliferation of wireless devices.

In particular, the IEEE 802.11ax project started in May 2014 with the formation of TGax as a successor to the successful IEEE 802.11ac standard. The main objectives of the TGax was to define a physical layer and a medium access control capable of supporting at least a four times improvement in average throughput per station in a dense deployment scenario when compared to IEEE 802.11ac. However, the 802.11ax standard itself does not address all issues that need to be solved. Further improvements are needed to maximize the potential of 802.11ax.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
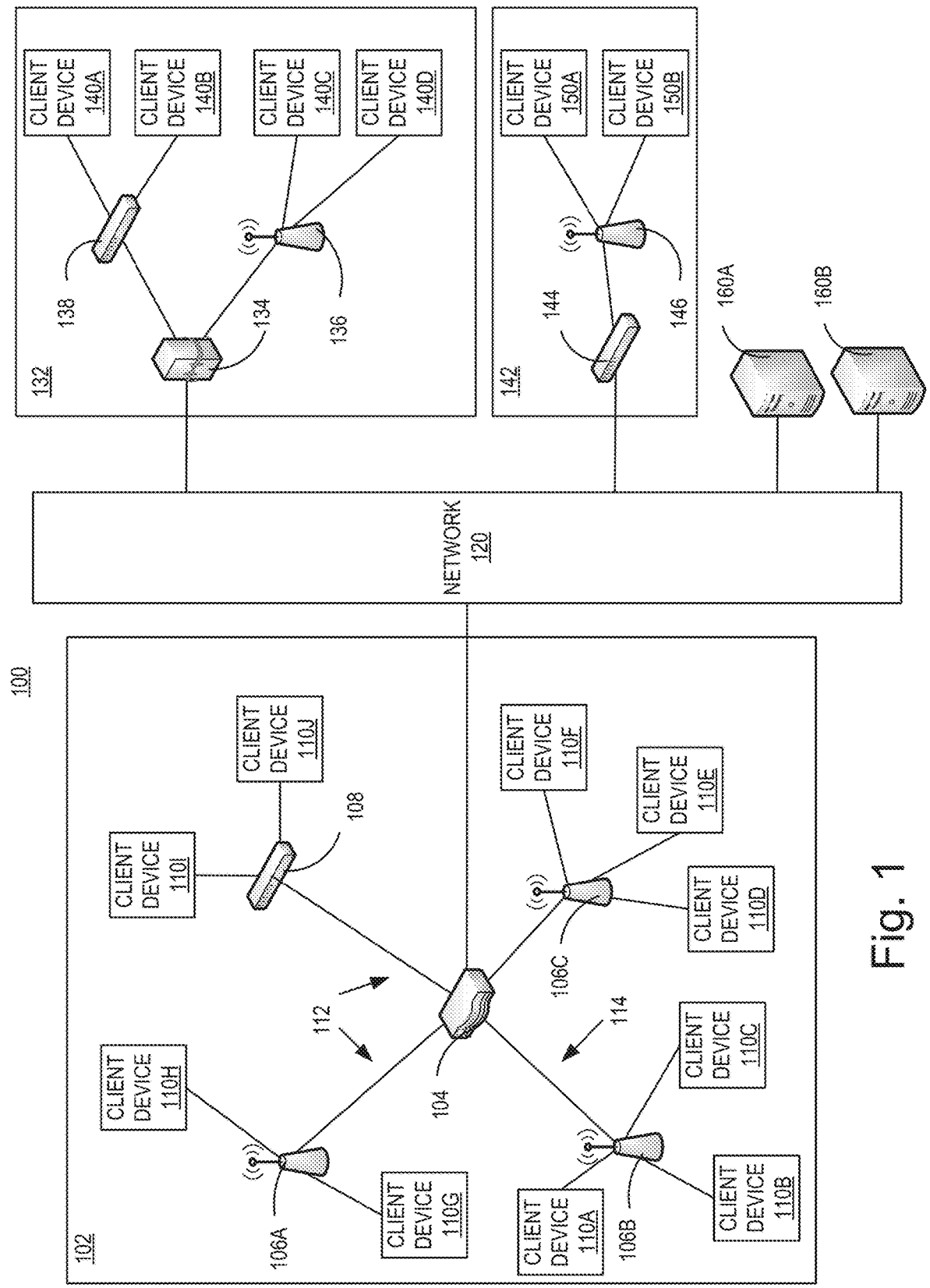
FIG. 1 illustrates one example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Implementations of the disclosed technology may include systems and methods to schedule the Resource Units (RUs) of a station for uplink traffic in 802.11ax, and any other subsequent, former, or other standard to which the described invention may apply.

To understand the present invention, a basic understanding of 802.11 and 802.11ax is needed. The minimum understanding necessary is described below, but further detail and guidance may be found in the 802.11ax standard, as well as other related 802.11 standards.

Multi-User Multiple Input Multiple Output (MU-MIMO) allows a wireless device, such as an access point, to communicate with multiple devices simultaneously. This decreases the time each device has to wait for a signal and can dramatically speed up a network. In short, MU-MIMO works by using multiple antennas to send data to multiple devices/stations.

One of the main features added to the 802.11ax specification was Orthogonal Frequency-Division Multiple Access (OFDMA). At a physical layer level it means multiple entities transmitting data at the same time over different frequency tones/subcarriers where the subcarriers are orthogonal to each other. A timeslot containing a certain group of tones is known as a RU.

IEEE 802.11ax defines downlink Multi-User Physical Layer Protocol Data Units (MU-PPDU) in a MU-MIMO format, an OFDMA format, or a mixture of both. The standard also defines uplink MU-PPDU in a MU-MIMO and OFDMA format. For the uplink MU-PPDUs, the access point needs to schedule one or more stations within a timeslot to send data on uplink using different RUs. The stations are notified of the transmit characteristics like (transmit power, modulation and coding, etc.) and the specific RU to be used for the uplink transmission.

However, there might be stations which have sporadic data to send on the uplink for which scheduled access would waste bandwidth. This is why uplink OFDMA Random Access (UORA) was added to the specification. This allows stations which are not scheduled to transmit on the uplink to contend for a Random Access Resource Unit (RA-RU). The access point signals the availability of RA-RUs and their usage via a trigger frame by specifying various parameters. The station sets the value of OFDMA Contention Window (OCW) to OCWmin (either the default one or the latest one broadcasted by the access point) and an integer value is randomly selected from a uniform distribution in the range 0 to OCW and assigns the value to the ODFMA Random Access Back Off (OBO) counter. If OBO counter is less than the number of available RA-RUs, then the station sets the OBO counter to 0, selects one of the available RA-RUs randomly and sends the PPDU on it. If the OBO counter is greater than number of RA-RUs, the station updates the OBO counter by decrementing it by the number of eligible RA-RUs and it does not transmit the PPDU. If the STA sends a PPDU in a RA-RU and does not receive an acknowledgement from the AP, it updates its OCW to min(2*OCW+1, OCWmax). On any subsequent successful retransmission it can reset the OCW to OCWmin. It is important to note that RUs and RA-RUs can co-exist in a single UL transmission.

Given this background, one can understand how the channel capacity may not be optimized unless stations are appropriately assigned channel access based on the amount and/or type of data that the stations send.

As described in more detail with reference to FIG. 1, a Wireless Lan (WLAN) may include a plurality of network devices, such as Access Points (APs), as elements of the WLAN. These APs in the deployed network may be referred to as deployed APs for ease of discussion.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, access points, and/or controllers, which are not directly part of the network configuration 100 but that facilitate communication between the various parts of the network configuration 100, and between the network configuration 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110*a j*, 140*a-d*, 150*a-b* may request and access the multimedia content provided by the content servers 160*a-b*.

Although 10 client devices 110*a-j*, or stations (STAs), are illustrated at primary site 102 in the example of FIG. 1, in various applications, a network may include a lesser or greater quantity of STA's. Indeed, some implementations may include a dramatically larger quantities of STAs. For example, various wireless networks may include hundreds, thousands, or even tens of thousands of STAs communicating with their respective APs, potentially at the same time.

Figure 2:
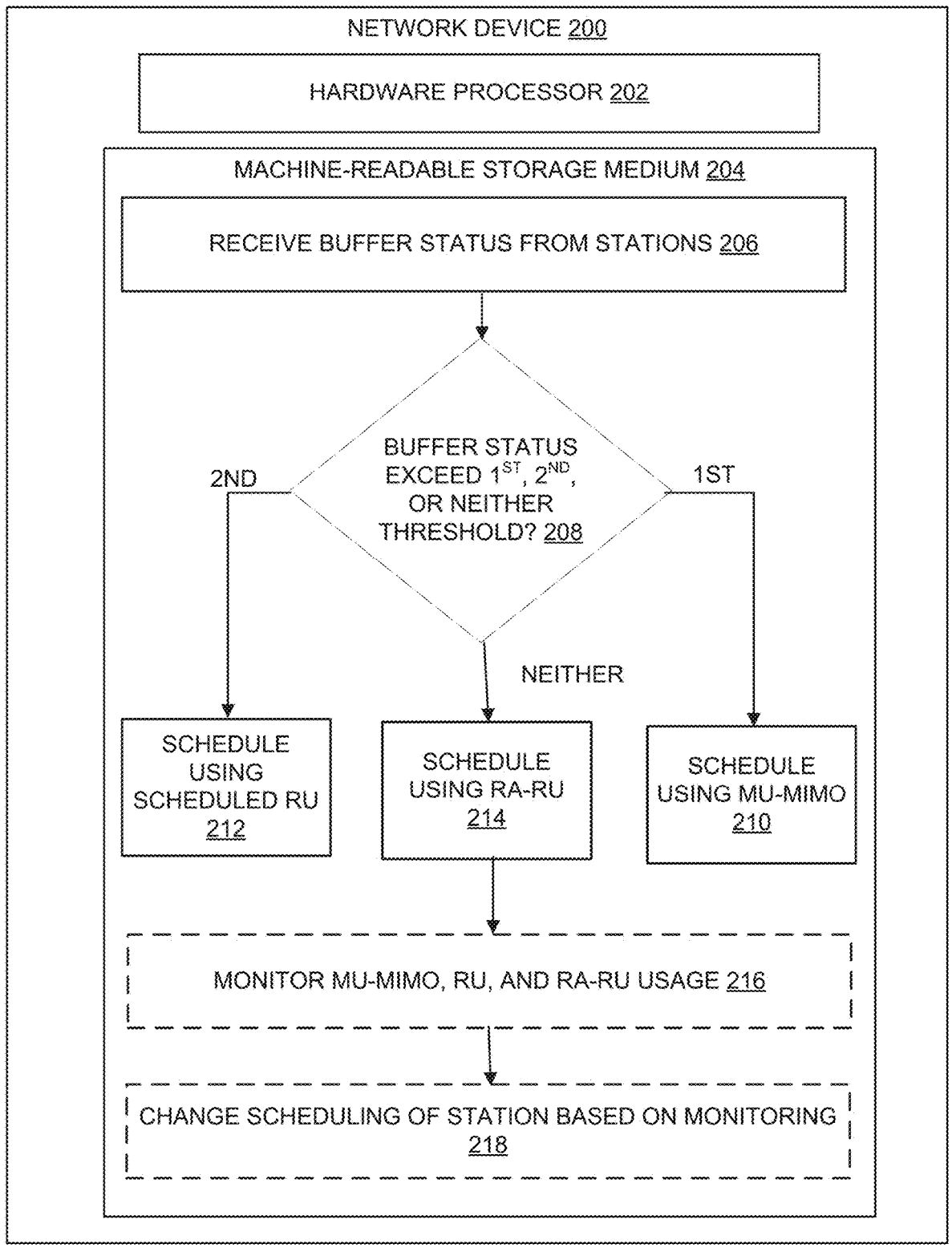
FIG. 2 is a block diagram of an example computing component for dynamic uplink resource unit scheduling in accordance with one embodiment.

FIG. 2 is a block diagram of an example network device 200 for dynamic uplink resource unit scheduling in accordance with one embodiment. Although the steps depicted in FIG. 2 are shown in an order, the steps may be performed in any order at any time. The hardware processor 202 is able to execute the instructions stored on the machine-readable storage medium 204 to perform the steps described below.

In step 206, buffer status reports are received from stations. The buffer status reports may be received at any time, at any interval, in any format, and in any suitable method. Typically, the buffer status reports are consistent with the requirements of 802.11, and received from the stations. The buffer status reports may contain any information including, but not limited to, the amount of data in the buffer which the station wants to send to the network device.

In step 208, a determination is made whether the buffers status exceeds a first threshold, a second threshold, or neither the first nor the second threshold. If the first threshold is exceeded, the method proceeds to step 210. If the second threshold is exceeded (but not the first), the method proceeds to step 212. If neither the first threshold nor the second threshold is exceeded, the method proceeds to step 214. The thresholds may be set to any amount by any entity, such as the manufacturer, a network administrator, a user etc. The thresholds may be updated dynamically based on data from the network, or on any other basis. The determination may be made in any suitable way at any time.

The first threshold is the largest, and indicates that there is a large amount of data to be sent. Hence exceeding the first threshold results in scheduling the station using the highest bandwidth option—MU-MIMO. The second threshold is smaller than the first threshold, and indicates that there is a medium amount of data to be send. Hence, exceeding the second threshold (but not the first) results in scheduling the station using the medium bandwidth option—scheduled RUs. Exceeding neither threshold indicates that there is little data to be sent. This situation may arise when there are management frames or other small, periodic data or updates to be sent, although the invention is not limited to this example. Hence, exceeding neither threshold results in scheduling the station using the lowest bandwidth option—RA-RUs.

Optionally, the first and second thresholds may be set to different amounts based on the make, model, operational class of the station, and/or any other factor. Further still, the first and second thresholds between two identical (i.e., same make/model, etc.) may vary based on other factors, such as use within a network, operational parameters of the basic service set, location, priority, or any other factors.

In step 210, a station is scheduled using MU-MIMO. As discussed above, using MU-MIMO is appropriate for higher data transmission needs than the other scheduling options. The transmissions may proceed in any suitable manner based on the scheduling. Once scheduled, a station may be rescheduled based on the station's usage of the assigned resources, as discussed below, to maximize usage of channel capacity, achieve minimum latency or any other performance metric.

In step 212, a station is scheduled using scheduled RUs. As discussed above, using scheduled RUs is appropriate for medium data transmission needs. The transmissions may proceed in any suitable manner based on the scheduling. Once scheduled, a station may be rescheduled based on the station's usage of the assigned resources, as discussed below, to maximize usage of channel capacity, achieve minimum latency or any other performance metric.

In step 214, a station is scheduled using RA-RUs. As discussed above, using RA-RUs is appropriate for lower data transmission needs than the other scheduling options. The transmissions may proceed in any suitable manner based on the scheduling. Once scheduled, a station may be rescheduled based on the station's usage of the assigned resources, as discussed below, to maximize usage of channel capacity, achieve minimum latency or any other performance metric.

In particular, the RA-RUs are randomly accessed by stations scheduled using RUs and scheduled using RA-RUs. In other words, stations relying on scheduled RUs may also compete for RA-RUs as needed. However, the MCS rate defined in the Trigger Frame for the RA-RUs may optionally be lowered such that the RA-RUs are not very effective for transmission of large amounts of data. Rather, the RA-RUs will be effective for transmitting small amounts of data, which will limit how often a station using scheduled RUs will also use RA-RUs. The MCS for the RA-RUs may be set to any amount, by any suitable entity.

In step 216, the usage of MU-MIMO, as well as OFDMA scheduled RUs, and RA-RUs is monitored. The usage, or utilization of channel capacity, or any other performance metric like latency may be monitored separately or in conjunction with each other, in any manner now known or later developed, for any amount of time and at any time. The monitoring data may be stored, processed, and/or transmitted, as needed.

In step 218, the scheduling of a station is changed based on the monitoring. Changing the scheduling of a station may be performed at any time, or even multiple times as the data needs of the station change. There may be a minimum time set before a station may be rescheduled, to prevent excessive rescheduling. A station may be changed from any type of scheduling to any other type of scheduling or to no scheduling mode (legacy 802.11 mode of operation). For example, a station may be scheduled for MU-MIMO but, based on monitoring, the station is rescheduled to RA-RUs. As another example, a station scheduled for MU-MIMO may be rescheduled to scheduled RUs. In another example, a station scheduled for scheduled RUs may be rescheduled to RA-RUs or vice versa depending on inefficient use or misuse of assigned RU resource to the station.

Figure 3:
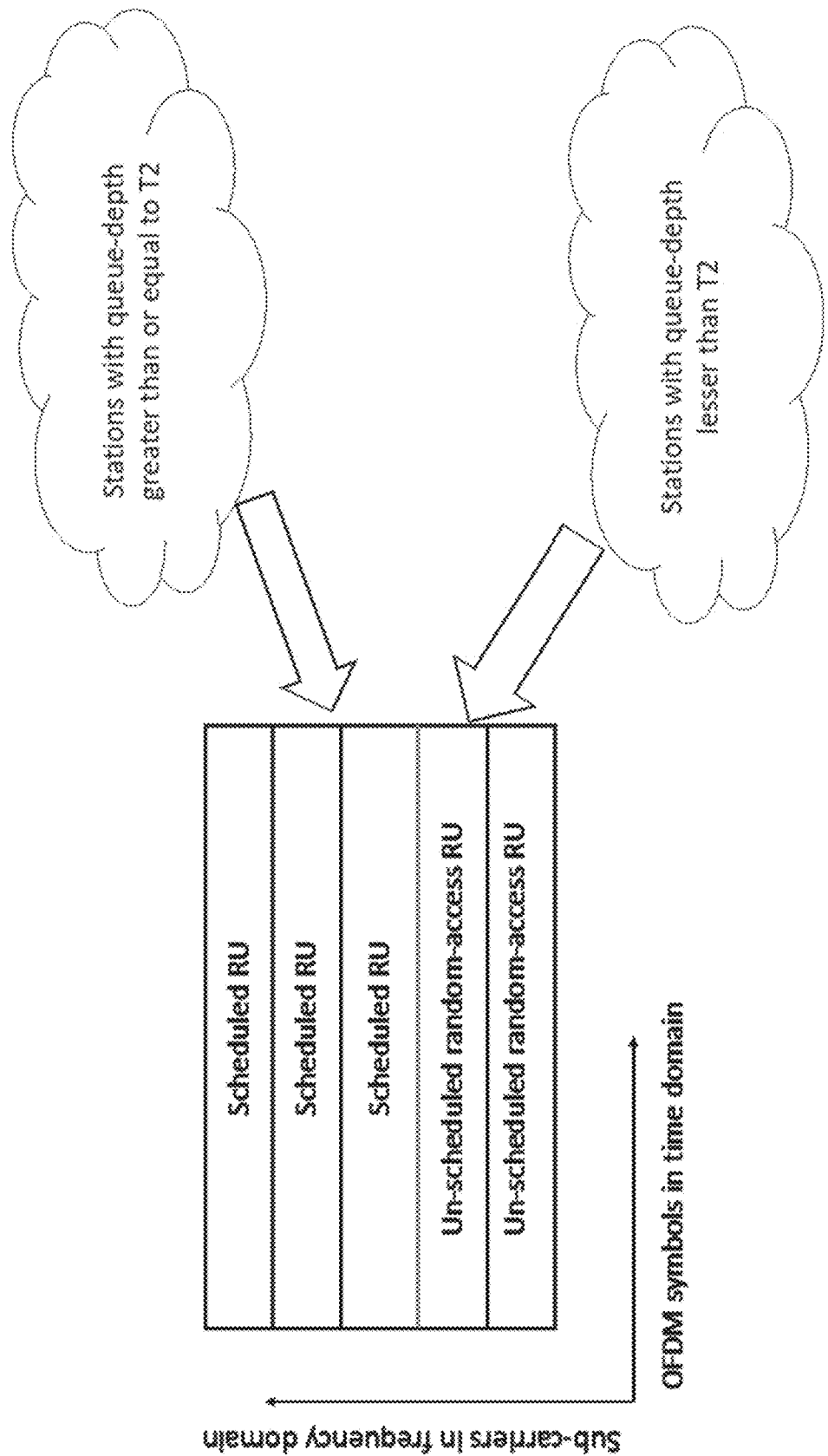
FIG. 3 illustrates an example of dynamic uplink resource unit scheduling in accordance with one embodiment.

FIG. 3 illustrates an example of dynamic uplink resource unit scheduling in accordance with one embodiment. In particular, this example shows how scheduled RUs and RA-RUs interact. The stations that have a queue depth (i.e., data buffer) greater than or equal to a second threshold (T2) are scheduled in one of the three scheduled RU blocks shown in FIG. 3. Alternatively, the stations with a queue depth less than T2 contend for one of the two unscheduled RA-RUs.

Figure 4:
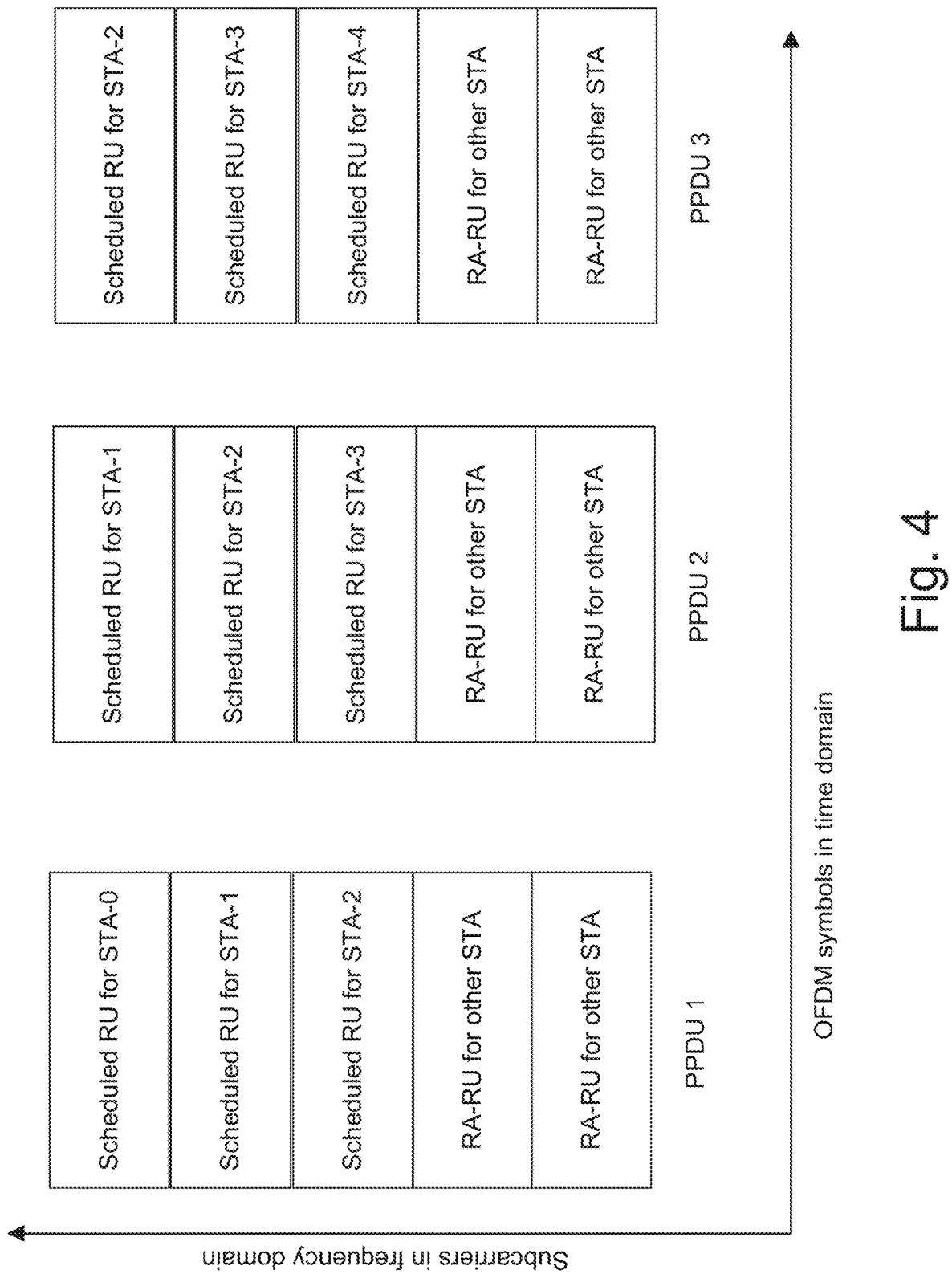
FIG. 4 illustrates an example of a round robin scheduling in accordance with one embodiment.

FIG. 4 illustrates of round robin scheduling in accordance with one embodiment. In particular, this example depicts an alternative way of scheduling stations. In some instances, buffer status reports may be unavailable for one or more stations. When this occurs, those stations are unable to be scheduled based on how much data is in their buffer because the network device has no information with which to make that decision. Instead, a different solution is needed.

The solution shown in FIG. 4 is a round robin solution. The stations that are needing to be scheduled are assigned a random number (in FIG. 4 it is from 0 to 4), and the scheduled RUs are assigned in order, and the stations are rotated through on each Physical Layer Protocol Data Unit (PPDU). Thus, in PPDU1 of FIG. 4, we see Station 0, 1, and 2 are assigned a scheduled RU, while stations 3 and 4 must rely on the RA-RUs. Then, in PPDU2, stations 1, 2, and 3 are assigned a scheduled RU, while stations 4 and 0 must rely on the RA-RUs. Finally, in PPDU3, stations 2, 3, and 4 are assigned a scheduled RU, while stations 0 and 1 must rely on the RA-RUs.

The examples depicted in FIG. 4 will also work for more or fewer stations, and for more or fewer scheduled RUs and/or RA-RUs. In the event that there are a greater than or equal number of stations to assign to the available RUs, all stations may be assigned a scheduled RU or all stations may be unscheduled (and thus rely on RA-RUs). Additionally, a station that has a scheduled RU in a particular PPDU may also contend for the available RA-RUs of that particular PPDU.

The example of FIG. 4 would also apply to any other scheduling methodologies now known or later developed besides the round robin example described in FIG. 4.

Figure 5:
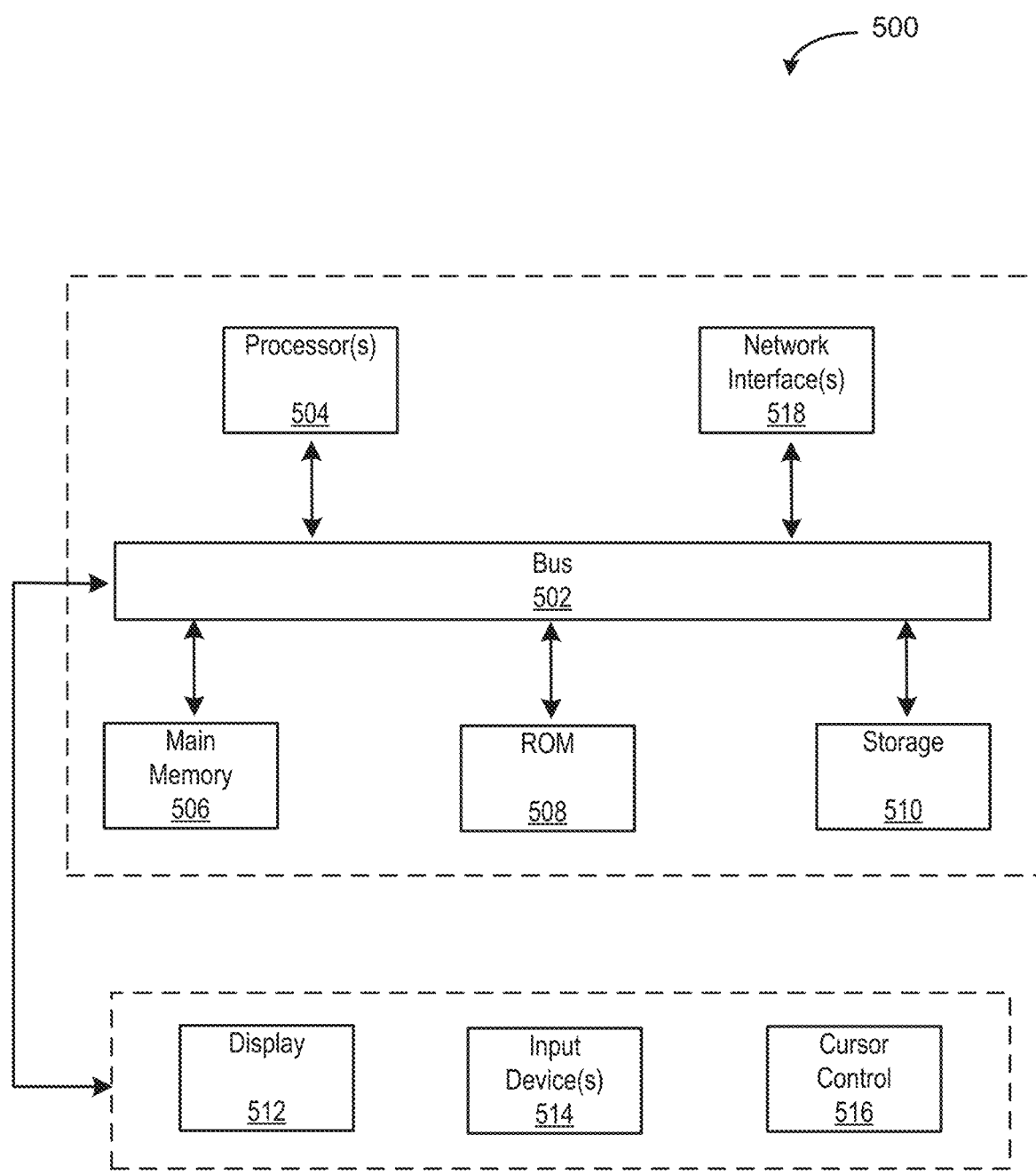
FIG. 5 is an example computing component that may be used to implement various features of embodiments described in the present disclosure.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic y, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:
1. A method, comprising:
  receiving, by a network device and from each of a plurality of stations, a status of a buffer;
  determining for each of the plurality of stations, by the network device, whether the status of the buffer of a particular station exceeds a first threshold, a second threshold, or neither the first threshold or the second threshold;

in response to the buffer of the particular station exceeding the first threshold, scheduling the particular station using Uplink Multi-User Multiple Input Multiple Output;

in response to the buffer of the particular station exceeding the second threshold, scheduling the particular station using a scheduled RU; and in response to the buffer exceeding neither the first threshold or second threshold, scheduling the particular station using a random-access resource unit (RA-RU).

2. The method of claim 1, wherein the first threshold exceeds the second threshold.

3. The method of claim 1, wherein the particular station is scheduled using the scheduled RU and wherein the particular station also contends for RA-RUs.

4. The method of claim 1, wherein the Modulation and Coding Scheme (MCS) for the RA-RUs is limited.

5. The method of claim 1, further comprising:
monitoring, by the network device, usage of RA-RUs; and
changing scheduling of a station of the plurality of stations based on usage of RA-RUs.

6. The method of claim 1, further comprising:
monitoring, by the network device, usage of scheduled RUs; and
changing scheduling of a station of the plurality of stations based on usage of scheduled RUs.

7. The method of claim 1, wherein the network device supports 802.11ax.

8. A non-transitory machine-readable storage medium encoded with instructions executable by a hardware processor of a computing component, the machine-readable storage medium comprising instructions to cause the hardware processor to:
receive, from each of a plurality of stations, a status of a buffer;
determine for each of the plurality of stations whether the status of the buffer of a particular station exceeds a first threshold, a second threshold, or neither the first threshold or the second threshold;
in response to the buffer of the particular station exceeding the first threshold, schedule the particular station using Uplink Multi-User Multiple Input Multiple Output;
in response to the buffer of the particular station exceeding the second threshold, schedule the particular station using a scheduled RU; and
in response to the buffer exceeding neither the first threshold or second threshold, schedule the particular station using a random-access resource unit (RA-RU).

9. The non-transitory machine-readable storage medium of claim 8, wherein the first threshold exceeds the second threshold.

10. The non-transitory machine-readable storage medium of claim 8, wherein the particular station is scheduled using the scheduled RU and wherein the particular station also contends for RA-RUs.

11. The non-transitory machine-readable storage medium of claim 8, wherein the Modulation and Coding Scheme (MCS) for the RA-RUs is limited.

12. The non-transitory machine-readable storage medium of claim 8, further comprising instructions to cause the hardware processor to:
monitor usage of RA-RUs; and
change scheduling of a station of the plurality of stations based on usage of RA-RUs.

13. The non-transitory machine-readable storage medium of claim 8, further comprising instructions to cause the hardware processor to:
monitor usage of scheduled RUs; and
changing scheduling of a station of the plurality of stations based on usage of scheduled RUs.

14. The non-transitory machine-readable storage medium of claim 8, wherein the network device supports 802.11ax.

15. A network device, comprising:
a processor;
a memory, the memory storing instructions which, when executed by the processor, cause the processor to:
receive, from each of a plurality of stations, a status of a buffer;
determine for each of the plurality of stations whether the status of the buffer of a particular station exceeds a first threshold, a second threshold, or neither the first threshold or the second threshold;
in response to the buffer of the particular station exceeding the first threshold, schedule the particular station using Uplink Multi-User Multiple Input Multiple Output;
in response to the buffer of the particular station exceeding the second threshold, schedule the particular station using a scheduled RU; and
in response to the buffer exceeding neither the first threshold or second threshold, schedule the particular station using a random access resource unit (RA-RU).

16. The network device of claim 15, wherein the first threshold exceeds the second threshold.

17. The network device of claim 15, wherein the particular station is scheduled using the scheduled RU and wherein the particular station also contends for RA-RUs.

18. The network device of claim 15, wherein the Modulation and Coding Scheme (MCS) for the RA-RUs is limited.

19. The network device of claim 15, further comprising instructions to cause the processor to:
monitor usage of RA-RUs; and
change scheduling of a station of the plurality of stations based on usage of RA-RUs.

20. The network device of claim 15, further comprising instructions to cause the processor to:
monitor usage of scheduled RUs; and
changing scheduling of a station of the plurality of stations based on usage of scheduled RUs.

* * * * *